Nov. 10, 1970  O. C. WAGNER  3,539,396

RECHARGEABLE ALKALINE ZINC SYSTEM

Filed Nov. 5, 1968

INVENTOR,
OTTO C. WAGNER.

BY: Roy Gordon
Harry M. Saragovitz,
Edward J. Kelly &
Herbert Berl

AGENT

ATTORNEYS.

United States Patent Office 3,539,396
Patented Nov. 10, 1970

3,539,396
RECHARGEABLE ALKALINE ZINC SYSTEM
Otto C. Wagner, Long Branch, N.J., assignor to the United States of America as represented by the Secretary of the Army
Filed Nov. 5, 1968, Ser. No. 773,426
Int. Cl. H01v 29/04
U.S. Cl. 136—86                    7 Claims

ABSTRACT OF THE DISCLOSURE

A rechargeable alkaline zinc-air electrical cell is provided including a pair of flat planar cathodes, a flat zinc anode positioned intermediate of and spaced from each of the cathodes, and means to provide electrolyte for the electrodes. These means include an electrolyte reservoir at the base of the battery in combination with an electrode separation system. The electrode separation system includes porous electrolyte absorbent material layers extending from the cathode and anode faces into the electrolyte reservoir, layers of non-oxidizable membrane material positioned between the electrolyte absorbent material layers, and a layer of about 0.001 to 0.020 inches in thickness of sintered and partially wetproofed nickel positioned between the layers of non-oxidizable membrane material.

The invention described herein may be manufactured used, and licensed by or for the Government for governmental purposes without the payment to me of any royalty thereon.

BACKGROUND OF THE INVENTION

Rechargeable alkaline zinc batteries have been investigated heretofore as power sources capable of high energy density applications. One of the major problems with their use is the short circuiting of the unit cells by growth of zinc dendrites from the anode to the cathode during the charging of the battery. The solution to this problem is to employ a separator or separation system whereby dendritic zinc cannot grow out of the anolyte compartment. Separator or separator systems presently used include:

(a) cellulosic membranes, such as cellophane or sausage casing;
(b) inorganic separators of the silicate-ceramic type;
(c) polyvinyl acetate membranes;
(d) carboxylated polyethylene; and
(e) combinations of these various separators and inter-separator materials such as cellulosic papers, woven nylon, non-woven polyamide or polypropylene felts and others.

When an alkaline-zinc battery is overcharged cycle after cycle, all of the above-mentioned separators fail by the zinc penetration mode of failure. The rate of zinc penetration is increased when the separator is degraded by oxidative attack from the cathode and/or nascent oxygen evolved from the cathode. This problem is particularly acute with zinc-air cells since the cells are zinc limiting in capacity on charge and discharge, and on charge nascent oxygen is continuously evolved from the air-cathode and reducible or degradeable separators are rendered inoperable as barriers to zinc preparation.

SUMMARY OF THE INVENTION

The general object of this invention is to overcome the problem of zinc penetration in alkaline zinc cells. A more particular object of this invention is to provide a long-lived high energy density rechargeable alkaline zinc-air cell.

According to the invention, a rechargeable zinc-air electrical cell is provided including a flat zinc anode positioned intermediate of and spaced from a pair of flat air cathodes. Means are further provided to transport electrolyte to the electrodes. These means include an electrolyte reservoir at the base of the battery in combination with an electrode separation system. The electrode separation system includes porous electrolyte absorbent dielectric material layers extending from the cathode and anode faces into the electrolyte reservoir, layers of non-oxidizable membrane dielectric material positioned between the layers of electrolyte absorbent material, and a layer of about 0.001 to 0.020 inch in thickness of sintered and partially wetproofed nickel positioned between the layers of non-oxidizable membrane material.

BRIEF DESCRIPTION OF THE DRAWING

The invention can best be understood by referring to FIGS. 1A, 1B, and 2 of the drawing wherein.

DESCRIPTION OF THE PREFERRED EMBODIMENT

Figure 1A:
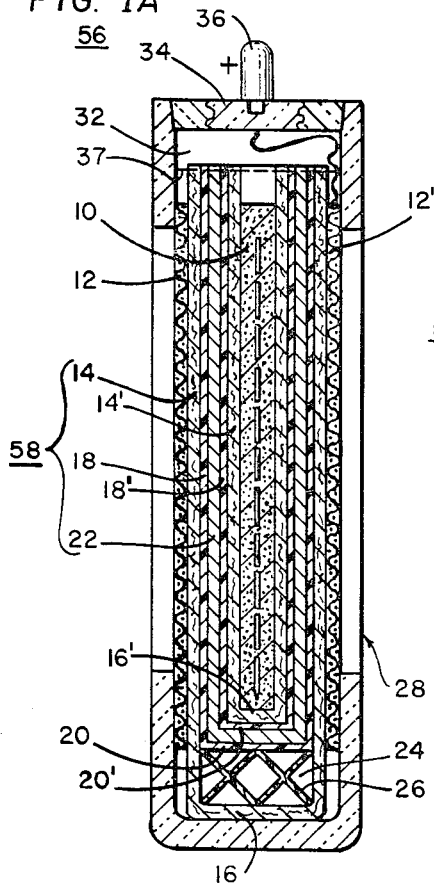
FIG. 1A shows a cross section of the unit zinc-air cell taken along the line A—A of FIG. 1B.
Figure 1B:
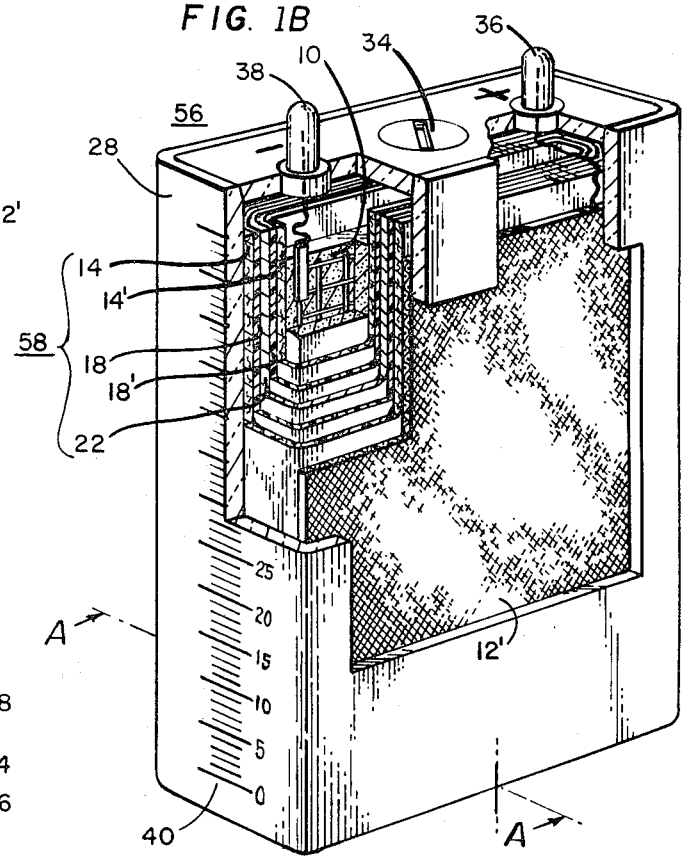
FIG. 1B shows a partially cut away view in perspective of a rectangular shaped unit zinc-air cell.

Referring now to FIGS. 1A and 1B, at 10 there is shown a flat zinc anode positioned intermediate and spaced from a pair of flat planar air cathodes 12 and 12'. The electrode separation system includes a first U-shaped layer 14 of electrolyte absorbent material having its arms in contact with the respective cathodes 12 and 12' and the base 16 thereof extending beyond the ends of the cathodes 12 and 12' and spaced from the lower end of the anode 10. A second U-shaped layer 14' of electrolyte absorbent material is spaced from the first U-shaped layer 14 having its arms in contact with anode 10 and its base 16' in contact with the lower end of anode 10 and spaced above the base 16 of the first U-shaped layer. In the space between the two electrolyte absorbent layers there is included a first U-shaped layer of non-oxidizable membrane material 18 having its arms in contact with the first U-shaped layer 14 of electrolyte absorbent material and its base 20 spaced from and below the base 16' of the second U-shaped layer of electrolyte absorbent material and spaced from and above the base 16 of the first U-shaped layer of electrolyte absorbent material. Further included in the space between the two electrolyte absorbent layers is a second U-shaped layer 18' of nonoxidizable membrane material that is spaced from the first U-shaped layer 18 of non-oxidizable membrane material and having its arms and base 20' in contact respectively with the arms of the second U-shaped layer 14' of electrolyte absorbent material and its base 16'. A U-shaped layer of about 0.001 to 0.020 inch in thickness of sintered nickel 22 fills the space between both layers of non-oxidizable membrane material as shown. The two electrolyte absorbent layers are made of the same material as for example, polyamide and polypropylene non-woven felts. The spacing between the base 20 of the first U-shaped layers of non-oxidizable membrane material and the base 16 of the first U-shaped layers of electrolyte absorbent material is filled with alkaline electrolyte to form a reservoir 24.

To properly position the anode 10 above the reservoir 24, a plastic spacer 26 is situated in the reservoir region. Since electrolyte from the reservoir 24 is to some extent forced up to a level 37 above the electrodes 10, 12 and 12' respectively, sufficient head space 32 must be provided to extend the reservoir above the electrodes. A cell case frame 28 is provided for the cell as shown. When properly sealed, the frame 28 extends over a minimum of the pores of the air cathodes 12 and 12' at the cathodeair interface. A filling hole 34 is provided in the upper part of frame 28. Head space 32 is provided between the anode 10 and the top part of frame 28. Suitable terminals for both the air cathode and the anode are provided as at 36 and 38 with the cathodes 12 and 12' being connected in common to the terminal 36 which is the positive terminal of the cell. In addition, frame 28 is made of transparent plastic and electrolyte level indicating marks 40 located thereon. When the electrolyte level drops below the "safe" level, water can be added to the cell through fill hole 34. With the arrangement as shown above, the wicking action to transport electrolyte to the cell electrodes is provided by the electrolyte absorbent layers.

Figure 2:
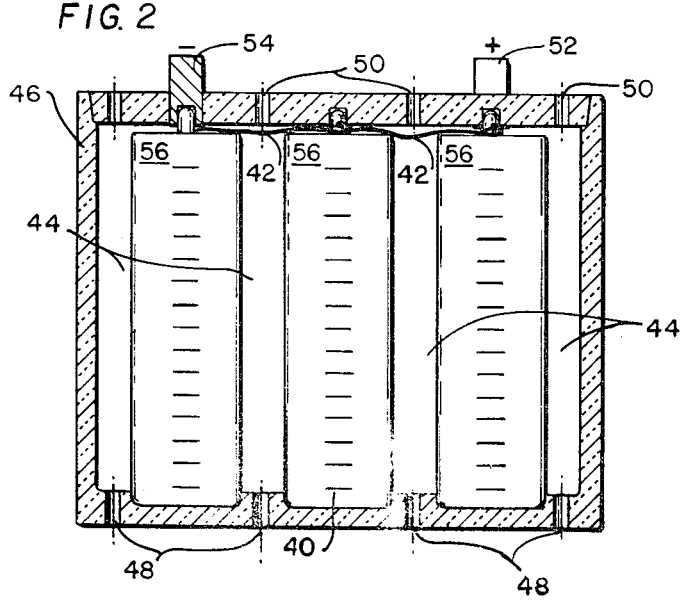
FIG. 2 shows a battery consisting of several stacked zinc-air unit cells.

Referring to FIG. 2, a battery consisting of a stack of unit zinc-air cells are electrically connected as shown by intercell connectors 42 and separated by air spacers 44 to provide continuous free air flow to the air electrodes 12 and 12'. The zinc-air stack is contained within a battery case 46 in which inlet air ports 48 and outlet air ports 50 are provided between each unit cell. Electrical circuitry is completed by the use of conventional battery terminal posts 52 and 54. As was described in FIG. 1, each unit zinc-air cell 56 will include a zinc anode 10, the composite electrode separation system 58 and electrolyte reservoir 24.

As the air cathode 12, any of the conventional air cathodes can be used as are presently used in fuel cell batteries. The air cathode used is bifunctional; that is, it charges and discharges. Its structure generally consists of a film of platinum and Teflon on which lies a conducting screen such as nickel or stainless steel over which lies a porous Teflon film which is exposed to the ambient air. The air cathode is about 10 mils in thickness.

The electrolyte reservoir 24 is provided to overcome water loss from the unit cell. In addition, a sufficient quantity of insoluble $Ba(OH)_2$ or $Ca(OH)_2$, in the order of 2 milligrams per ampere-hour per cycle for $Ba(OH)_2$, and 1 milligram per ampere-hour per cycle for $Ca(OH)_2$ can be added to the sump to remove carbonate ions and thereby prevent loss of activity of the air-cathode. The optimum concentration of the KOH electrolyte in a conventional alkaline metal-air cell is 20 to 40 percent by weight. Normally, 30 percent is employed. To prevent the concentration from exceeding 35 percent in the sump or reservoir type metal-air cell during cycling, more dilute electrolyte must be initially employed. The proper initial concentration is about 30 percent KOH. The proper amount of electrolyte in the unit cell is the amount required to fill the pores of the anode and separator plus an excess required to fill the reservoir.

The electrolyte absorbent material layers 14 and 14' provide the wick means to wet the electrodes. Examples of suitable materials are polyamide and polypropylene non-woven felts, pigmentary potassium titanate (with Teflon or polyphenylene oxide binder), and ceric oxide matrices, etc. The material may be conveniently joined to the electrodes by heat sealing or cementing its edges about the anode and plastic spacer in the sump. The electrolyte absorbent material layer(s) is about 2 to 10 mils in thickness.

The non-oxidizable and non-degradeable membrane material layers 18 and 18' are positioned between the electrolyte absorbent layers. The membrane material must stop any migration of anode and cathode material and oxygen. Examples of membrane materials that can be used include alumina-silicate ceramic or zirconium phosphate (with Teflon or polyphenylene oxide binder) cellulosics such as cellophane, polyvinyl alcohol film and carboxylic grafted polyethylene. The thickness of each membrane layer is about 1 to 8 mils. Sandwiched between the layers of non-oxidizable membrane material 20 is a layer of a sintered low hydrogen over-potential material or alloy 22 such as nickel, iron, cobalt, platinum, palladium, indium, chromium, manganese, carbon, titanium, etc., of which nickel and iron are preferred, in thickness range of about 1 to 20 mils. As was previously stated this layer is preferably wetproofed (with Teflon, polyethylene, etc.).

The mechanism involved in preventing zinc shorting in the unit zinc-air cell is as follows. As the zinc anode is overcharged, dendritic zinc penetrates the adjacent electrolyte absorbent layer and non-oxidizable membrane layer. As penetration continues, the zinc dendrite enters the pores of the sintered nickel or iron layer. It is believed that continual growth through this layer is stopped because:

(a) the porous path through the sintered structure is of such high tortuosity that a long path is required for the development of a continuous zinc trail through this layer;

(b) the layer is partially wetproofed (by Teflon or polyethylene) so that adsorption of zincate ions on the sintered substrate is difficult, a process making zinc plating on the substrate very inefficient; and (c) the zinc resides within the wetproofed sintered maze long enough to dissolve at a rate faster than zinc electrodeposition (by the local action of $$Zn - 2e + 4(OH^-) \rightarrow Zn(OH)_4^=$$

on the dendrite and $2H_2O + 2e \rightarrow H_2 + 2OH^-$ at the cathodic sinter sites). As a result of this local action, the zinc dendrite disappears. Consequently the layers of electrolyte absorbent material and non-oxidizable membrane material adjacent the cathode are never penetrated by zinc and shorting is prevented.

One practical method of making the unit zinc-air cell is to wrap the zinc anode with a layer of electrolyte absorbent material and/or membrane. Then, a sintered nickel or iron plaque is wrapped about the membrane in one or more turns (layers). The plaque may be 0.001 to 0.020 inch thick. Preferably, the plaque is wetproofed with Teflon or polyethylene. The fabrication is then completed by wrapping the membrane and an electrolyte absorbent material about the plaque and sandwiching the wrapped zinc anode with the cathodes of the unit cell.

Another method of making the unit zinc-air cell is to prepare a 0.005 to 0.010 inch thick electrolyte absorbent bag of polyamide felt or asbestos that is free of iron or other low hydrogen overpotential material. The bag is then coated with a silicate ceramic solution to a film thickness of 0.001 to 0.010 inch. The ceramic is then coated with a slurry of carbonyl nickel or iron powder and 1 to 3 percent by weight of (CM) binder to a film thickness of 0.001 to 0.020 inch. After drying, the nickel or iron clad bag is sintered at 900 degrees C. under a reducing atmosphere as for example, hydrogen, for ten minutes. After cooling, under a reducing atmosphere, the sintered layer is impregnated with a Teflon emulsion by coating the outside layer by spraying or using a brush. It is important that the Teflon does not enter the pores of the electrolyte absorbent bag; therefore, it is desirable to spray the nickel with Teflon in a solvent of low boiling point. The Teflon treated nickel is then cured at 300 degrees C. for about ten minutes. Then, a coat of silicate-ceramic is applied about the sintered layer to a thickness of 0.001 to 0.010 inch. After drying, a 0.005 inch thick layer of polyamide felt is wrapped about the separator clad zinc anode and the electrode pack is sandwiched within the cathodes into a unit cell.

It is desired that the nickel or iron layer be sintered so as to form a structure in which the metal particles are interconnected, and form pores with open paths of high tortuosity. The nickel or iron layer can also be made by binding the nickel or iron particles with a suitable binder such as Teflon, polyphenylene oxide, polypropylene, etc. In some instances, the binder may be interlocked with the metal particles by heat curing.

To test the factor of zinc penetration as it would affect a unit zinc-air cell, a zinc penetration tester was employed as described on pages 129 to 141 of "Characteristics of Separators for Alkaline Silver-Oxide-Zinc Secondary Batteries" by J. E. Cooper and A. Fleischer, copyright 1964 by A. F. Aero Propulsion Laboratory. The control test consisted of two layers of 0.001 inch thick cellophane membrane between the zinc cathode and a platinum reference electrode. At a charging current density of 10 milliamperes per square inch, the cell shorted in 50 minutes. In a test cell consisting of a 10 mil thick partially wet-proofed sintered nickel plaque situated between the two layers of .001 inch thick cellophane, shorting did not occur, even after 100 hours of overcharge.

Various modifications are seen as coming within the scope of the invention. For example, the composite electrode separator herein described can be used in other alkaline zinc systems such as zinc-silver, zinc-manganese dioxide, zinc-copper, and zinc-nickel batteries.

The zinc anode can be designed and formulated to minimize shape change, or edge corrosion, during cycling of the battery. To wit, one construction is to contain the active zinc within a honeycombed matrix such as sintered Teflon or polyethylene and to extend the edges of the zinc anode beyond those of the air cathode so that an excess of active zinc oxide will be located at the edges of the anode; thereby providing a reservoir of zinc species for electrodeposition at the periphery of the anode. In addition, the anode can be slightly concave in the center to prevent the buildup of high internal cell pressures that result from the electrodeposition and densification of zinc in the central region of the anode. These design features of the zinc anode are exemplary of the present state of the art and are not intended as constituting a part of this invention.

Then too, instead of a flat configuration as shown in FIGS. 1 and 2, cylindrical and spiral cell configurations can be used. The cylindrical unit cells can be stacked side by side with proper air space separation or can be stacked one on top of the other into a cylindrical battery configuration. The spiral configuration consisting of a spirally wound sandwich of separator clad anode, bifunctional air electrodes, and air spacers, results in a high capacity compact unit cell which can be stacked into a battery case in the same manner as with the cylindrical cells.

The foregoing description is to be considered merely as illustrative of the invention and not in limitation thereof.

What is claimed is:

1. A rechargeable zinc-air electrical cell comprising a pair of flat planar air cathodes,
    a flat zinc anode positioned intermediate said air cathodes and spaced therefrom, and means to provide electrolyte for said electrodes, said means including an electrolyte reservoir at the base of the cell and an electrode separation system comprising spaced layers of electrolyte absorbent dielectric material intermediate said cathodes and anode and wetted by the electrolyte in said reservoir to provide wicking action for the electrodes, spaced layers of non-oxidizable membrane dielectric material positioned between the electrolyte absorbent layers, and a porous layer of about 0.001 to 0.020 inch in thickness of sintered metal and partially wetproofed low hydrogen overpotential material between the layers of non-oxidizable membrane material.

2. A rechargeable zinc-air electrical cell according to claim 1 wherein the electrolyte reservoir includes a sufficient quantity of a water insoluble compound taken from the group consisting of barium hydroxide and calcium hydroxide to remove carbonate ions and thereby prevent loss of activity by the air cathode.

3. A rechargeable zinc-air electrical cell according to claim 1 wherein the electrolyte used in an aqueous solution of 20 to 40 percent by weight of potassium hydroxide.

4. A rechargeable zinc-air electrical cell according to claim 1 wherein the electrolyte absorbent material is selected from the group consisting of polyamide and polypropylene non-woven felts, pigmentary potassium titanate, and ceric oxide matrices.

5. A rechargeable zinc-air electrical cell according to claim 1 wherein the non-oxidizable membrane material is selected from the group consisting of aluminasilicate ceramic, zirconium phosphate, cellophane, polyvinyl alcohol film and carboxylic grafted polyethylene.

6. A rechargeable zinc-air electrical cell according to claim 1 wherein the low hydrogen overpotential material is nickel.

7. A rechargeable zinc-air electrical cell according to claim 1 wherein the low hydrogen overpotential material is iron.

References Cited

UNITED STATES PATENTS

| | | |
|---|---|---|
| 3,057,943 | 10/1962 | Straiss. |
| 3,207,630 | 9/1965 | Solomon et al. ____ 136—132 X |
| 3,333,986 | 8/1967 | Chreitzberg et al. __ 136—30 X |

ALLEN B. CURTIS, Primary Examiner

U.S. Cl. X.R.

136—132